United States Patent [19]

Moraru

[11] 4,258,090
[45] Mar. 24, 1981

[54] METHOD FOR THE PROTECTION OF CONCRETE IN SEA WATER

[75] Inventor: Dino S. Moraru, Bucharest, Romania

[73] Assignee: Institutul de Cergetari in Constructii si Economia Constructilor Incerc, Bucharest, Romania

[21] Appl. No.: 5,038

[22] Filed: Jan. 19, 1979

[51] Int. Cl.$^3$ .............................................. B05D 3/02
[52] U.S. Cl. .................................. 427/386; 106/15.05; 114/65 A; 422/6; 427/393.6; 427/407.1; 427/402; 428/907; 427/419.2
[58] Field of Search .................... 427/385 C, 386, 302, 427/393.6, 407.1, 419; 106/15.05; 422/6; 114/65 A, 67 R, 67 A; 428/907; 264/DIG. 80; 260/22 R, 22 A, 22 XA, 29.2 EP, 45.7 SW, 45.7 RL

[56] References Cited

U.S. PATENT DOCUMENTS

| 3,154,460 | 10/1964 | Graner | 114/67 R |
|---|---|---|---|
| 3,575,123 | 4/1971 | Shepherd et al. | 114/67 R |
| 3,793,975 | 2/1974 | Duff | 114/65 A |
| 3,857,934 | 12/1974 | Bernstein et al. | 428/907 X |
| 3,990,381 | 11/1976 | Shepherd et al. | 114/67 R |
| 4,020,200 | 4/1977 | Groszek et al. | 114/67 R X |
| 4,025,693 | 5/1977 | Milne | 428/907 X |
| 4,051,279 | 9/1977 | Peterson | 428/907 X |

FOREIGN PATENT DOCUMENTS 48-31975  3/1973  Japan ....................................... 428/907

Primary Examiner—Ralph S. Kendall
Assistant Examiner—Thurman K. Page
Attorney, Agent, or Firm—Karl F. Ross

[57] ABSTRACT

A new method is disclosed for treating a concrete surface to be used in contact with sea water to prevent fouling of the surface, which comprises the steps of: (a) fluating the concrete surface with an aqueous solution of a compound selected from the group consisting of fluorosilicic acid, calcium fluorosilicate, magnesium fluorosilicate, and zinc fluorosilicate of sufficient concentration to strengthen the concrete surface and to prevent biodeterioration thereof; (b) treating the concrete surface with a biocide insoluble in water and selected from the group consisting of copper naphthenate, beta-naphthol, pentachlorophenol and tributyl-tin oxide to prevent biodeterioration of the concrete surface; and (c) fixing the concrete surface treated during steps (a) and (b) by treating the surface with the biocide defined in step (b) in solution with a polyesteric resin or an epoxy resin.

11 Claims, No Drawings

METHOD FOR THE PROTECTION OF CONCRETE IN SEA WATER

FIELD OF THE INVENTION

My present invention relates to methods for the protection of concrete in sea water and other biologically active waters.

BACKGROUND OF THE INVENTION

Methods and biocides are known for combating the biodegradation of waters by fouling agents. Romanian Pat. No. 57,257, representative of this prior art, discloses a solution containing biocidal substance only, within a suitable solvent, and having a viscosity adapted to promote deep capillary pentration into the concrete.

The disadvantages of the prior art as exemplified by that patent are:

(a) the necessity to apply four layers of paint;

(b) no provision for strengthening the surface structure of the cured concrete;

(c) does not change the biocide used in accordance with the particular fouling agents present;

(d) makes no provision for a supplementary mechanical-fixation treatment with biocide at the same time—apart from the basic treatment with biocide itself—such provision being necessary where the friction phenomenon is significant;

(e) makes no provision for the separate application of both biocides in stages.

OBJECT OF THE INVENTION

The object of my present invention, therefore, is to provide a method of treating concrete surfaces immersed in sea water and other biologically active waters, to prevent fouling of such concrete surfaces while avoiding the drawbacks of conventional methods including those enumerated above.

SUMMARY OF THE INVENTION

I realize this object, in accordance with my invention, by the provision of a method which comprises three separate stages of treatment, namely:

(a) fluating of concrete surfaces resulting in their simultaneous strengthening and anti-fouling protection by means of an aqueous solution having 3–5% by weight fluorosilicic acid or calcium, magnesium or zinc fluorosilicate applied by painting or spryaing;

(b) treatment against biodeterioration by means of a complex solution of 45–50% biocide by weight within a common organic solvent, for instance white-spirit, the application being effected by painting or spraying in one or two coats; and (c) fixation treatment by a fungicide solution of synthetic resins, e.g. polyesters or epoxides, in a proportion of 4–6% by weight within the solution used in the second stage (b). The application is carried out as mentioned above.

The solutions employed in the above three stages all possess a viscosity enabling a deep capillary penetration into the porous medium of the concrete to be protected.

The biocide compounds which can be used either separately or together in practicing the method of my invention are: copper naphthenate, betanaphthol, pentrachlorophenol, tributyltin oxide and fluorosilicic acid.

In accordance with a feature of the invention, the composition of a solution containing any of the above biocides is varied in strength according to the fouling agents encountered in the waters surrounding the concrete to be protected, such selected strengths being based on the toxicity spectrum of the biocide. Where several biocides are used together, i.e. mixed in solution, I prefer to add them in equal parts. All dosages are by weight.

Pursuant to a further feature of my invention, the fixation treatment is carried out by applying to the concrete surfaces a fungicide solution of synthetic resins, e.g. polyesters or epoxides, as described in more detail hereinafter.

SPECIFIC DESCRIPTION AND EXAMPLES

The method of my invention for protecting concrete immersed in sea water and other biologically active waters consists in the application—during three successive stages of which one or two may be omitted or inverted under certain conditions—of treatments in accordance with the following examples.

EXAMPLE 1

Fluating

Fluating is done by means of a solution in water of 3–5% fluorosilicic acid, Ca, Zn or Mg fluorosilicate (dosage by weight), the rate of the active substance being increased by one percent according to the saltiness of the sea water, i.e. for intervals up to 15%O, between 15–25%O and over 25%O.

EXAMPLE 2

Treatment Against Biodeterioration of Concrete Surfaces

This treatment is carried out by the use of biocide compounds or substances, as prescribed hereinafter, according to the nature of the concrete-surface fouling agents and the number of germs contained in a volume unit of the biologically active water.

Treatment applications are provided in one to two coatings depending on the number of germs (bacteria sulphate reducing agent) present in the unit of volume of biologically active water, thus:

1 coat if between $10^5$ and $5 \times 10^5$ 2 coats if between $5 \times 10^6$ and $10^6$ Any of the following biocide compounds may be used in the above treatment:

copper naphthenate, active against the majority of fouling agents; there is utilized a 94% copper naphthenate solution diluted with 50% white-spirit (by weight) in a proportion of 5–10 parts copper naphthenate solution to 9.0–9.5 parts white-spirit (by weight);

betanaphthol, active against filamentous or fibrous sea algae and winding worms; there is utilized a 12% betanaphthol solution in white-spirit (by weight) further diluted in a proportion of 5–10 parts solution to 9.0–9.5 parts white-spirit (by weight);

pentachlorophenol, active against the majority of fouling agents; there is utilized a solution of 12% pentachlorophenol in white-spirit (by weight), further diluted in the same proportions as given for betanaphthol;

tributyl tin oxide, active against the majority of fouling agents. Utilize a 6% tributyl tin oxide solution in white-spirit (by weight), further diluted in a proportion of 5–10 parts solution to 9.0–9.5 parts white-spirit (by weight).

When several compounds are used, depending on the toxicity spectrum specific to each of them, their mixing is in equal parts.

EXAMPLE 3

Fixation Treatment

The fixation treatment is performed by means of a biocide solution according to the compositions set forth under Example 2, to which a 4–6% polyester or epoxy resin solution in volume is added having the following compositions (the rate and parts being indicated by weight):

polyesteric resin solution accelerated by 0.5–0.8% cobalt octoate (6% cobalt in octoate) 12 parts, monostyrene as solvent 10 parts; to the utilized quantity of resin peroxide of methyl-ethyl-ketone 50% solution in dibutylphthalate 0.25 parts are added to start the polymerization.

epoxy resin solution with 5–45% hardener according to the type of resin (see below); to the 10 parts of solvent (8 parts toluene and 2 parts ethylic or methylic alcohol) 12 resin parts with hardener are added.

There are listed below several compositions of epoxydic resin solution type ARALDITE, made by CIBA-GEIGY, Switzerland, in which the quantity of resin represents 3% of the weight of the indicated solvent.

| Resin | Hardener | Admixture |
| --- | --- | --- |
| AY 101 100 parts | HY 951 5–6 parts | — |
| AY 101 100 parts | HY 956 10–12 parts | — |
| AY 121 100 parts | HY 951 4–4,5 parts | — |
| CY 221 100 parts | HY 837 25 parts | Silane A 186 1 part |
| GY 250 100 parts | X 157 2273 15 parts | — |
| DY 022 100 parts | HY 2954 45 parts | — |
| LY 554 100 parts | HY 554 20 parts | — |

The technique of application of the treatments in Examples 1, 2 and 3 is as follows:

The fluating (Example 1) is performed applying 1-2 coats with 30 minutes intermission by painting or spraying with a compressed air gun (5–6 atm.). The biocide treatment that follows, as per Example 2, is applied 24 hours after fluating.

The biocide treatment (Example 2) is applied in 1–2 coats, the second one 30 minutes after the first coat. The fixation treatment, as per Example 3, may be carried out 1 hour after the biocide treatment.

The fixation treatment (Example 3) is applied in 1–2 coats, the interval of time between the two coats being at least 1 hour.

The foregoing three stages of treatment need not all be applied but, depending on the degree of hostility of the environment, may be applied only singly, i.e. any of the stages alone, or in combinations of two or three of them. The application of stages 1 and 2 may be made in reverse order as may at times be deemed appropriate.

The advantages of the method, solutions and technology of the present invention, as described above, for the protection of concrete immersed in sea water and other biologically active waters, are:

penetrability to depths of about 10 mm into the thickness of the concrete, utilizing its porous structure for a good fixation in depth;

the application is easily done by a mere surface treatment;

the application entails easy access and cheap materials;

besides the bioprotection a cured surface is obtained;

the treated surface has a large toxicity spectrum and an unlimited life;

permits the resumption of concreting without sanding;

enables the immersion in sea water of the concrete, reinforced concrete or prestressed concrete prefabs before the maturation of the cement stone (hard cement), i.e. immersion in only 1–2 weeks instead of 1–2 months; enables, thanks to the fixation treatment, the utilization in sea water of supply lines heretofore subjected to the detrimental effects of fixation fouling in sewer systems and at sites of marine construction of reinforced or prestressed concrete slips;

permits reducing the concrete covering layer of reinforcements at reinforcing or prestressing concrete works both in sea water and sea environment, i.e.:

in sea water, in estuaries or river deltas (salinity under 15%O) and up to 2 m above the water level, the concrete covering is reduced from 5 cm to 4 cm when the concrete used has a permeability of 4 and a water/cement factor of 0.6;

in normal sea water (salinity between 15%O and 35%O) the concrete covering is reduced from 6 cm to 4.5 cm independent of the diameter of reinforcement if there are applied the three protection stages on a concrete with a permeability of 8 and a water/cement factor of 0.5;

in sea environment, independent of the saltiness thereof, the concrete covering is reduced from 3 cm to 2 cm if the three protection stages are applied and to 2.5 cm if only stages 1 and 3 are applied.

I claim:

1. A method of treating a concrete surface to be used in contact with sea water to prevent fouling of said surface which comprises the steps of:
   (a) fluating the concrete surface with an aqueous solution of a compound selected from the group consisting of fluorosilicic acid calcium fluorosilicate, magnesium fluorosilicate, and zinc fluorosilicate of sufficient concentration to strengthen the concrete surface and to prevent biodeterioration thereof;
   (b) treating the concrete surface with a biocide insoluble in water and selected from the group consisting of copper naphthenate, beta-naphthol, pentachlorophenol and tributyl tin oxide to prevent biodeterioration of the concrete surface; and
   (c) fixing the concrete surface treated during steps (a) and (b) by treating the surface with the biocide defined in step (b) in solution with a polyesteric resin or an epoxy resin.

2. The method defined in claim 1, step (a) wherein the aqueous solution is a 3 to 5% solution by weight of the compound.

3. The method defined in claim 1, step (a) wherein the fluating treatment entails the application of one or two coats of the compound.

4. The method defined in claim 1, steps (a), (b) or (c) wherein the treatment of the concrete surface is carried out by spraying or painting.

5. The method defined in claim 1, step (b), wherein the treatment of the concrete surface with the biocide entails one or two applications.

6. The method defined in claim 1, step (b), wherein the treatment of the concrete with the biocide is carried out with a 45 to 50% by weight solution in an organic solvent.

7. The method defined in claim 1, step (c), wherein the fixing entails one or two treatments with the solution.

8. The method defined in claim 1 wherein step (a) is carried out prior to step (b).

9. The method defined in claim 1 wherein step (b) is carried out prior to step (a).

10. The method defined in claim 9 wherein step (b) is commenced about 24 hours after step (a) is completed.

11. The method defined in claim 10 wherein step (b) entails two treatments and wherein the second treatment is applied at least 30 minutes after finishing the first treatment.

* * * * *